(12) United States Patent
Wack et al.

(10) Patent No.: US 11,741,387 B2
(45) Date of Patent: Aug. 29, 2023

(54) TECHNIQUES FOR QUICKLY REVISING WAVEFORMS FOLLOWING CALIBRATION OF A QUANTUM SYSTEM

(71) Applicant: International Business Machines Corporation, Armonk, NY (US)

(72) Inventors: Andrew Wack, Millbrook, NY (US); John Lemek, Hyde Park, NY (US); Ryan Woo, Tenafly, NJ (US); Jessie Yu, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 202 days.

(21) Appl. No.: 17/095,412

(22) Filed: Nov. 11, 2020

(65) Prior Publication Data

US 2022/0147854 A1 May 12, 2022

(51) Int. Cl.
*G06N 10/00* (2022.01)
*G06N 10/20* (2022.01)
*G06N 5/022* (2023.01)
*G06N 20/00* (2019.01)
*G06N 10/80* (2022.01)

(52) U.S. Cl.
CPC ............. *G06N 10/00* (2019.01); *G06N 10/20* (2022.01); *G06N 5/022* (2013.01); *G06N 10/80* (2022.01); *G06N 20/00* (2019.01)

(58) Field of Classification Search
CPC ........ G06N 10/00; G06N 10/20; G06N 10/80; G06N 20/00; G06N 5/022
See application file for complete search history.

(56) References Cited

U.S. PATENT DOCUMENTS

| 10,606,720 | B2 | 3/2020 | Kelly | |
|---|---|---|---|---|
| 2017/0357561 | A1* | 12/2017 | Kelly | .................. G06F 11/2247 |
| 2020/0379768 | A1* | 12/2020 | Berkley | ................. G06N 10/00 |

FOREIGN PATENT DOCUMENTS

| EP | 3 469 523 A1 | 4/2019 |
|---|---|---|
| WO | 2019005206 | 1/2019 |

OTHER PUBLICATIONS

Kelly, et al., "Physical Qubit Calibration on a Directed Acyclic Graph," arXiv preprint arXiv:1803.03226, Mar. 8, 2018, 7 pages.
International Search Report and Written Opinion received for PCT Application Serial No. PCT/EP2021/080877 dated Mar. 4, 2022, 15 pages.

(Continued)

*Primary Examiner* — Terrell S Johnson
(74) *Attorney, Agent, or Firm* — Amin, Turocy & Watson, LLP (57) ABSTRACT

Techniques facilitating quick waveform revisions following quantum system calibrations. In one example, a system can comprise a processor that executes computer executable components stored in memory. The computer executable components comprise: a calibration component; and a regeneration component. The calibration component can identify a parameter of a directed graph changed by a calibration of a quantum system that occurs after generation of the directed graph. The regeneration component can revise the directed graph based on the identified parameter to generate an updated directed graph.

25 Claims, 7 Drawing Sheets

(56) References Cited

OTHER PUBLICATIONS

Carvalho et al., "Error-robust quantum logic optimization using a cloud quantum computer interface", arXiv:2010.08057v1 [quant-ph], Oct. 19, 2020, 22 pages.
Alexander et al., "Qiskit Pulse: Programming Quantum Computers Through the Cloud with Pulses", arXiv:2004.06755v1 [quant-ph], Apr. 14, 2020, 16 pages.
Earnest et al., "Pulse-efficient circuit transpilation for quantum applications on cross-resonance-based hardware", arXiv:2105.01063v1 [quant-ph], May 3, 2021, 12 pages.
Cross et al., "OpenQASM 3: A broader and deeper quantum assembly language", arXiv:2104.14722v2 [quant-ph], Mar. 18, 2022, 54 pages.

* cited by examiner

TECHNIQUES FOR QUICKLY REVISING WAVEFORMS FOLLOWING CALIBRATION OF A QUANTUM SYSTEM

BACKGROUND

The subject disclosure relates to quantum computing, and more specifically, to techniques of facilitating quick waveform revisions following quantum system calibrations.

Some quantum computers receive quantum circuits or programs in a specialized language of waves and pulses. Significant abstraction has been achieved so that such quantum circuits can be submitted by entities to a computing service as higher-level languages rather than as the specialized language of waves and pulses that some quantum computers receive. The computing service can translate the quantum circuits or programs that an entity submits in a higher-level language to waveforms and pulse schedules that a quantum computer can interpret via waveform generation. In some respects, waveform generation processes can be interpreted as analogous to a process that an assembler implements to assemble instructions for implementation by a classical computer. Waveform generation processes are generally performed based on calibration data from the most recent calibration of a quantum system that will execute a given quantum circuit. Such waveform generation processes generally take a non-negligible amount of time and computational resources to perform before a quantum circuit can be executed or run by a quantum system.

Control parameters of a quantum system deviate from a calibrated state over time, which introduces noise and other sources of error into results obtained from executing quantum circuits on a quantum system. For example, a quantum circuit can include one or more gates. Calibrations can dictate the definition of these gates as defined pulses. During a waveform generation process, these defined pulses can be converted into a directed graph of pulses. The head of the directed graph of pulses can be the very end of a sequence of defined pulses and each edge is directed in a direction of a previous pulse. Those pulses can then be scheduled and can receive strict time representations when the pulses can be emitted to a quantum system and when the pulses will stop being emitted. Any deviations from the calibrated state can negatively impact those strict time representations, which in turn introduces noise and other sources of error.

Mitigating such noise and other sources of error generally involves calibrating the quantum system to return the control parameters to a calibrated state. When calibrations occur, any waveforms previously generated based on prior calibration data become invalidated or outdated. Completely rebuilding or regenerating invalidated waveforms to execute on the recalibrated quantum system generally involves reperforming each step of the waveform generation process using the new calibration data to generate an updated waveform. To the extent that waveform generation processes generally take a non-negligible amount of time and computational resources to perform, revising invalidated waveforms without repeating each step of a waveform generation process both reduce error and improve computational efficiency.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate quick waveform revisions following quantum system calibrations are described.

According to an embodiment, a system can comprise a processor that executes computer executable components stored in memory. The computer executable components comprise: a calibration component; and a regeneration component. The calibration component can identify a parameter of a directed graph changed by a calibration of a quantum system that occurs after generation of the directed graph. The regeneration component can revise the directed graph based on the identified parameter to generate an updated directed graph.

According to another embodiment, a computer-implemented method can comprise identifying, by a system, a parameter of a directed graph changed by a calibration of a quantum system that occur after generation of the directed graph. The computer-implemented method can further comprise revising, by the system, the directed graph based on the identified parameter to generate an updated directed graph.

According to another embodiment, a computer program product can comprise a computer readable storage medium having program instructions embodied therewith. The program instructions are executable by a processor to cause the processor to perform operations. The operations can include identifying a parameter of a directed graph changed by a calibration of a quantum system that occur after generation of the directed graph. The operations can further include revising the directed graph based on the identified parameter to generate an updated directed graph.

According to another embodiment, a computer-implemented method can comprise identifying, by a system, a plurality of parameters of a directed graph changed by a calibration of a quantum system that occur after generation of the directed graph. The computer-implemented method can further comprise revising, by the system, the directed graph based on the identified plurality of parameters in one pass to generate an updated directed graph.

According to another embodiment, a computer-implemented method can comprise detecting, by a system, a calibration of a quantum system that invalidates a directed graph after generation of the directed graph. The computer-implemented method can further comprise identifying, by the system, a parameter of a directed graph changed by the calibration of the quantum system. The computer-implemented method can further comprise revising, by the system, the directed graph based on the identified parameter to generate an updated directed graph.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Classical computers operate on binary digits (or bits) that store or represent information as binary states to perform computing and information processing functions. In contrast, quantum computing devices operate on quantum bits (or qubits) that store or represent information as both the binary states and superpositions of the binary states. To that end, quantum computing devices utilize quantum-mechanical phenomena, such as entanglement and interference.

A quantum computation uses a qubit as its essential unit instead of a classical computing bit. The qubit (e.g., quantum binary digit) is the quantum-mechanical analog of the classical bit. Whereas classical bits can employ on only one of two basis states (e.g., 0 or 1), qubits can employ on superpositions of those basis states (e.g., $\alpha|0\rangle + \beta|1\rangle$, where $\alpha$ and $\beta$ are complex scalars such that $=\alpha=^2+=\beta|^2=1$), allowing a number of qubits to theoretically hold exponentially more information than a same number of classical bits.

Thus, quantum computers (e.g., computers that employ qubits instead of solely classical bits) can, in theory, quickly solve problems that can be extremely difficult for classical computers. The bits of a classical computer are simply binary digits, with a value of either 0 or 1. Almost any device with two distinct states can serve to represent a classical bit: a switch, a valve, a magnet, a coin, etc. Qubits, partaking of the quantum mystique, can occupy a superposition of 0 and 1 states. It's not that the qubit can have an intermediate value, such as 0.63; when the state of the qubit is measured, the result is either 0 or 1. But in the course of a computation, a qubit can act as if it were a mixture of states—for example: 63 percent 0 and 37 percent 1. General quantum programs require coordination of quantum and classical parts of a computation. One way to think about general quantum programs is to identify processes and abstractions involved in specifying a quantum algorithm, transforming the algorithm into executable form, running an experiment or simulation, and analyzing the results. A notion throughout these processes is use of intermediate representations. An intermediate representation (IR) of a computation is neither its source language description nor the target machine instructions, but something in between. Compilers may use several IRs during a process of translating and optimizing a program. The input is source code describing a quantum algorithm and compile time parameter(s). The output is a combined quantum/classical program expressed using a high-level IR. A distinction between a quantum and classical computer is that the quantum computer is probabilistic, thus measurements of algorithmic outputs provide a proper solution within an algorithm specific confidence interval. The computation is then repeated until a satisfactory probable certainty of solution can be achieved.

By processing information using laws of quantum mechanics, quantum computers offer novel ways to perform computation tasks such as molecular calculations, financial risk calculations, optimization and many more.

As discussed above, control parameters of a quantum system deviate from a calibrated state over time, which introduces noise and other sources of error into results obtained from executing quantum circuits on a quantum system. Mitigating such noise and other sources of error generally involves calibrating the quantum system to return the control parameters to a calibrated state. When calibrations occur, any waveforms previously generated based on prior calibration data become invalidated or outdated. Completely rebuilding or regenerating invalidated waveforms to execute on the recalibrated quantum system generally involves reperforming each step of the waveform generation process using the new calibration data to generate an updated waveform.

Embodiments of the present disclosure describe techniques of revising waveforms (or compiled quantum programs) based on new calibration data without repeating each step of the waveform generation process to generate an updated waveform. In accordance with one or more embodiments described herein, existing waveforms can be revised based on the new calibration data using less computational resources than would be involved in repeating each step of the waveform generation process to generate an updated waveform. For example, a calibration of a quantum system may increase or decrease an amount of time for emitting waves for implementing a specific gate on the quantum system. As described in greater detail below, existing waveforms or pulse schedules can be revised by editing a pulse duration to generate an updated waveform using embodiments of the present disclosure instead of by repeating each step of the waveform generation process. As such, embodiments of the present disclosure provide computationally efficient techniques of facilitating quick waveform revisions following quantum system calibrations.

Figure 1:
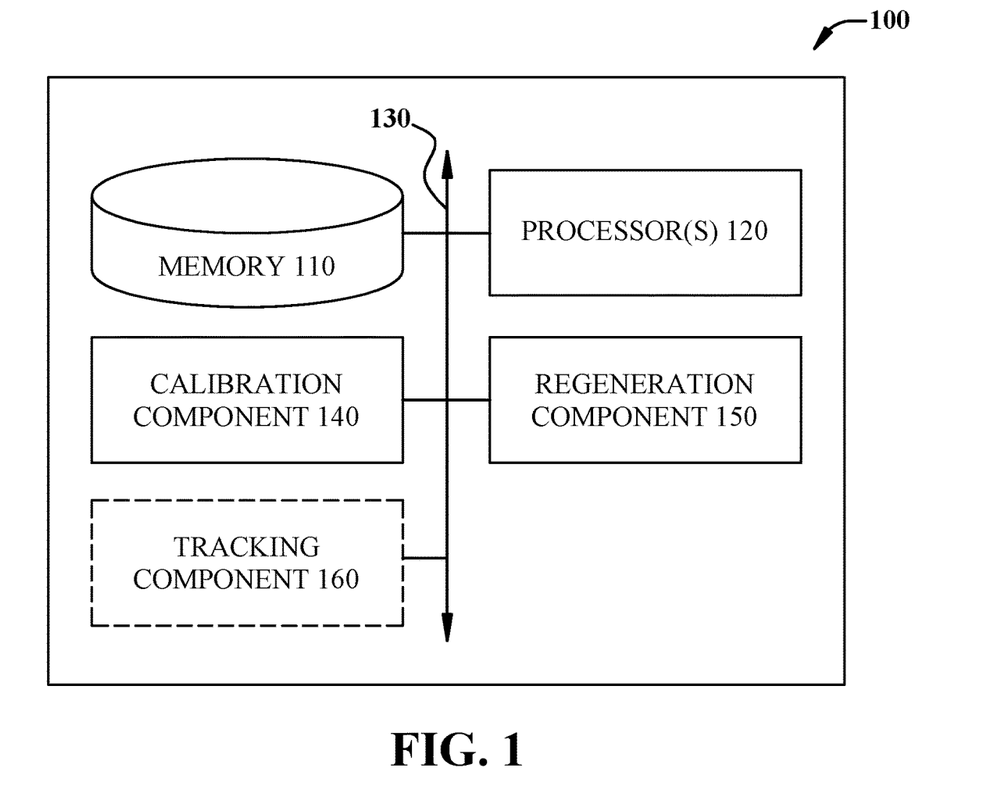
FIG. 1 illustrates a block diagram of an example, non-limiting system that can facilitate quick waveform revisions following quantum system calibrations, in accordance with one or more embodiments described herein.

FIG. 1 illustrates a block diagram of an example, non-limiting system 100 that can facilitate quick waveform revisions following quantum system calibrations, in accordance with one or more embodiments described herein. System 100 includes memory 110 for storing computer-executable components and one or more processors 120 operably coupled via one or more communication busses 130 to memory 110 for executing the computer-executable components stored in memory 110. As shown in FIG. 1, the computer-executable components include: calibration component 140; and regeneration component 150.

Calibration component 140 can identify a parameter of a directed graph changed by a calibration of a quantum system that occurs after generation of the directed graph. In an embodiment, the parameter includes: pulse phase; pulse duration; pulse frequency; pulse amplitude; gate definition; or a combination thereof. In an embodiment, the calibration component can identify the parameter using metadata associated with a plurality of named pulses comprising the directed graph. In an embodiment, the calibration component can interrupt a job queue of the quantum system that comprises the directed graph.

Regeneration component 150 can revise the directed graph based on the identified parameter to generate an updated directed graph. In an embodiment, regeneration component 150 can revise the directed graph by modifying respective pulse frequencies of a pulse and an associated pulse. In an embodiment, regeneration component 150 can modify the respective pulse frequencies using a list traversal or respective hash tables of the pulse and the associated pulse. In an embodiment, regeneration component 150 can revise the directed graph by inserting or removing a placeholder pulse to maintain synchronization within the updated directed graph. In an embodiment, regeneration component 150 can revise the directed graph by modifying respective pulse amplitudes of a pulse and an associated pulse. In an embodiment, a subset of the directed graph can remain unchanged in the updated directed graph.

In an embodiment, system 100 can evaluate, using a model, computation costs associated with revising the directed graph based on the identified parameter prior to regeneration component 150 revising the directed graph. In an embodiment, the model can be implemented using one or more machine learned model(s) trained to determine computation costs associated with rebuilding directed graphs and/or revising directed graphs. Any known artificial intelligence, machine learning, knowledge-based, or rule-based mechanisms can be used to train the one or more machine learned models using training data. Examples of such mechanisms include support vector machines, neural networks, expert systems, Bayesian belief networks, fuzzy logic, data fusion engines, classifiers, and the like. The training data can be obtained from data sets comprising historical calibration data, historical computation cost data, or a combination thereof. In an embodiment, system 100 can rebuild the directed graph to generate a new directed graph responsive to an evaluation that indicates the computation costs associated with revising the directed graph exceed computation costs associated with the rebuilding.

In an embodiment, the computer-executable components stored in memory 110 can further include tracking component 160. Tracking component 160 can monitor calibration data to detect changes that invalidate directed graphs. The functionality of the computer-executable components utilized by the embodiments will be covered in greater detail below.

Figure 2:
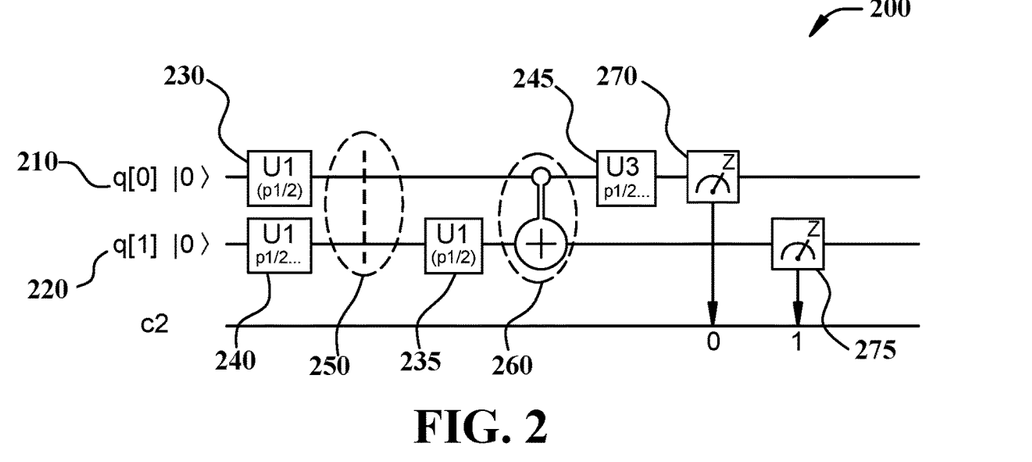
FIG. 2 illustrates an example, non-limiting quantum circuit that is suitable for implementing aspects of one or more embodiments described herein.

FIG. 2 illustrates an example, non-limiting quantum circuit 200 that is suitable for implementing aspects of one or more embodiments described herein. As shown by FIG. 2, quantum circuit 200 includes a U1 gate 230 applied to a first qubit 210 and a U3 gate 240 applied to a second qubit 220. In an embodiment, U1 gate 230 can implement a single-qubit rotation about a Z-axis of rotation and U3 gate 240 can implement single-qubit rotations about three axes of rotation (e.g., an X-axis of rotation, a Y-axis of rotation, and a Z-axis of rotation). Quantum circuit 200 further includes a barrier operation 250 applied to first qubit 210 and second qubit 220 after application of U1 gate 230 and U3 gate 240 to first qubit 210 and second qubit 220, respectively. In an embodiment, barrier operation 250 facilitates maintaining separation between different gates or operations of quantum circuit 200.

After application of barrier operation 250, quantum circuit 220 includes a U1 gate 235 applied to second qubit 220. FIG. 2 further shows that quantum circuit 200 includes a controlled-X gate 260 applied to first qubit 210 and second qubit 220 after application of barrier operation 250 and U1 gate 235 to first qubit 210 and second qubit 220, respectively. In an embodiment, controlled-X gate 260 can flip a state of a target qubit (e.g., second qubit 220) if a control qubit (e.g., first qubit 210) is in a |1⟩ state. Quantum circuit 200 further includes a U3 gate 245 applied first qubit 210 after application of controlled-X gate 260. In quantum circuit 200, a measurement operation 270 is applied to first qubit 210 after application of U3 gate 245 and a measurement operation 275 is applied to second qubit 220 after application of controlled-X gate 260.

In some embodiments, a quantum circuit (e.g., quantum circuit 200 of FIG. 2) can be converted to a waveform for input to a quantum system that physically implements or executes the quantum circuit via waveform generation. A waveform can be a directed graph of named pulses (or pulses) with associated metadata and a mapping of the named pulses to a signal that a drive source applies to the quantum system for executing a quantum circuit. Waveform generation can include three steps. One of those steps can include converting high-level information defining the quantum circuit into a directed graph of named pulses with directed edges pointing to future pulses. The directed graph generated from such conversion can be referred to as a circuit graph, which is described in greater detail below with respect to FIG. 3.

Another step of waveform generation can include adding timing information to the circuit graph based on calibration data from a most recent calibration performed on a quantum system. Adding such timing information can facilitate fitting (or aligning) the named pulses of the circuit graph with time slots of a signal that a drive source applies to the quantum system for executing a quantum circuit. In an embodiment, each time slot defines an equal partition of time. When such timing information is added, the circuit graph is transformed into a graph that can be referred to as a pulse-in-time graph, which is described in greater detail below with respect to FIG. 4. In general, a pulse-in-time graph can be a directed graph with vertices comprising metadata. Examples of such metadata include: a start time st, an end time et, a parent gate pg, a named pulse p, a datum for an associated pulse p', and combinations thereof. In an embodiment, a quantum system can comprise a plurality of qubits that process a pulse-in-time graph in parallel to execute a quantum circuit.

Another step of waveform generation can include adding frequency information, amplitude information, and/or shape information to the pulse-in-time graph to facilitate generating a waveform. In an embodiment, a waveform can be implemented as a set of two elements, {P,T}, where P is a pulse-in-time graph and T is a lookup table from named pulses p to actual waves. The lookup table T can include a frequency $f$, an amplitude a, and/or a shape of each actual wave. In an embodiment, a lookup table T can be a mapping of named pulses comprising an associated pulse-in-time graph P to a signal that a drive source applies to the quantum system for executing a quantum circuit. In an embodiment, a set of two elements, {P,T}, comprising a waveform can facilitate instruction sequences for control electronics driving hardware of a quantum system to implement a quantum circuit.

Figure 3:
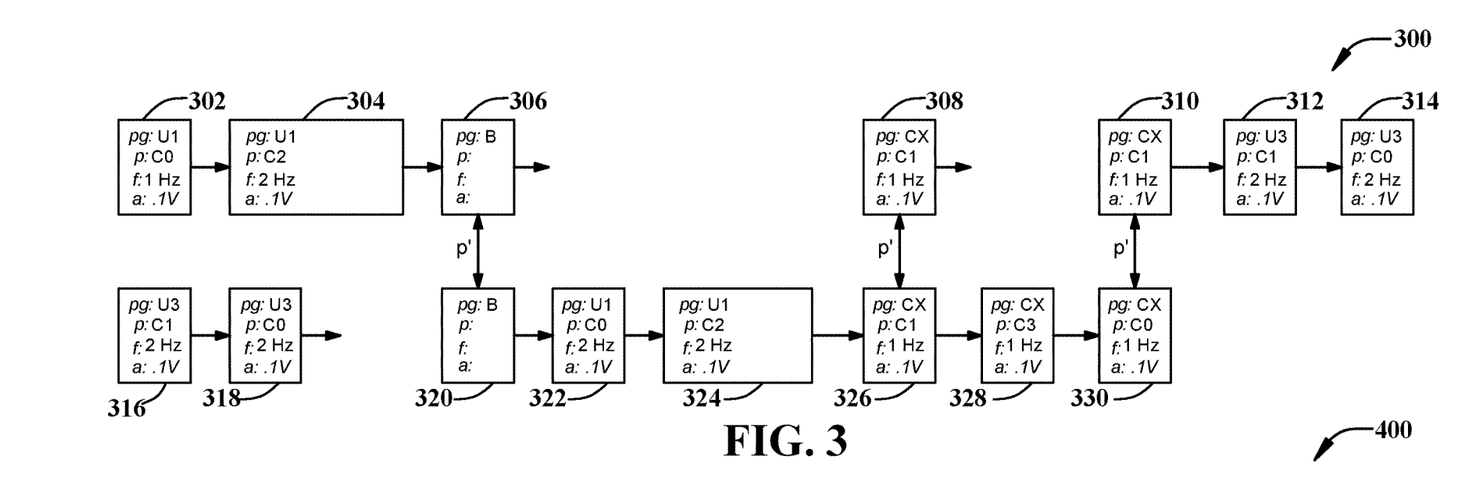
FIG. 3 illustrates an example, non-limiting circuit graph, in accordance with one or more embodiments described herein.

FIG. 3 illustrates an example, non-limiting circuit graph 300, in accordance with one or more embodiments described herein. In an embodiment, circuit graph 300 can be generated by converting high-level information defining quantum circuit 200 of FIG. 2. As shown by FIG. 3, circuit graph 300 includes multiple pulses that each correspond to one or more named pulses for implementing a particular gate or operation of quantum circuit 200. In circuit graph 300, pulses 302 and 304 correspond to C0 and C2 pulses, respectively, that can be applied to first qubit 210 to implement the U1 gate 230 of quantum circuit 200. Pulses 316 and 318 correspond to C1 and C0 pulses, respectively, that can be applied to second qubit 220 to implement the U3 gate 240 of quantum circuit 200. Pulses 306 and 320 can be applied to first qubit 210 and second qubit 220, respectively, to implement the barrier operation 250 of quantum circuit 200.

In circuit graph 300, pulses 322 and 324 of circuit graph 300 correspond to C0 and C2 pulses, respectively, that can be applied to second qubit 220 to implement the U1 gate 235 of quantum circuit 200. Pulses 308 and 310 correspond to two C1 pulses that can be applied to first qubit 210 to implement the controlled-X gate 260 with respect to first qubit 210. Pulses 326, 328, and 330 correspond to C1, C3, and C0 pulses, respectively, that can be applied to second qubit 220 to implement the controlled-X gate 260 with respect to second qubit 220. Pulses 312 and 314 correspond to C1 and C0 pulses that can be applied to first qubit 210 to implement the U3 gate 245 of quantum circuit 200.

Figure 4:
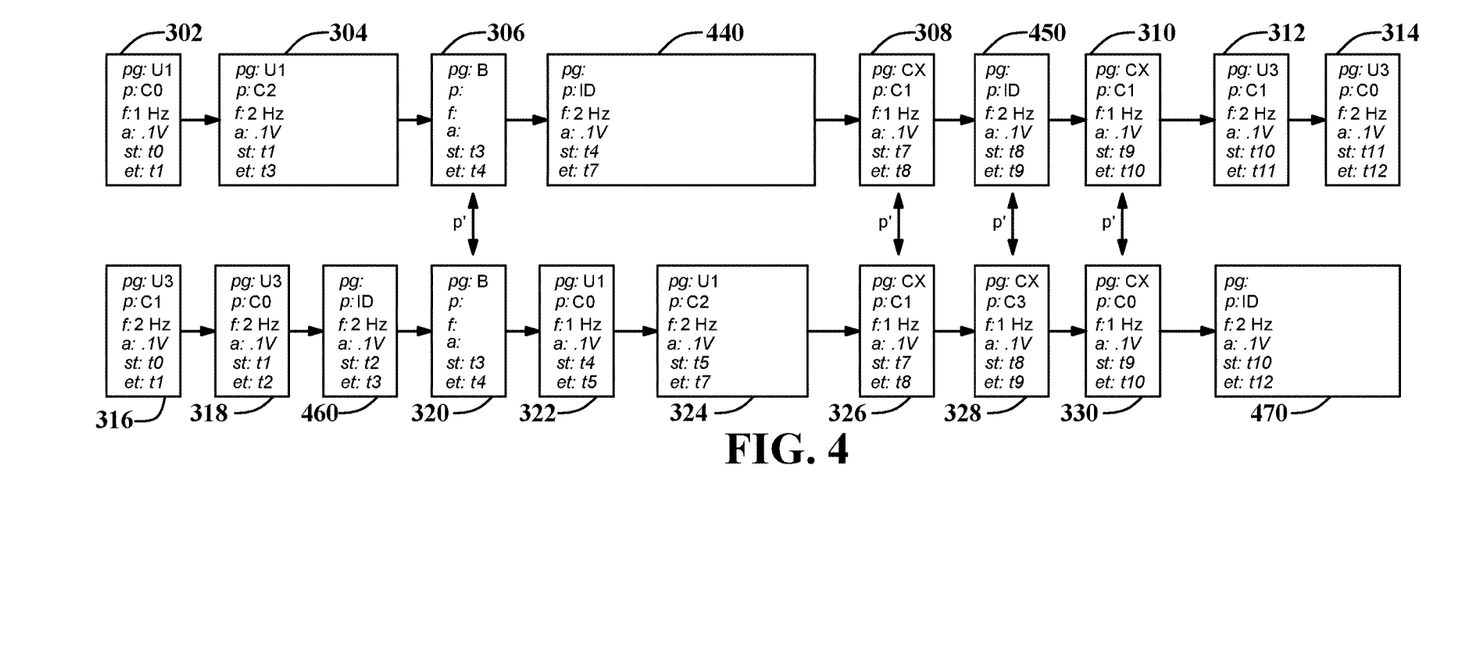
FIG. 4 illustrates an example, non-limiting pulse-in-time graph, in accordance with one or more embodiments described herein.

FIG. 4 illustrates an example, non-limiting pulse-in-time graph 400, in accordance with one or more embodiments described herein. In an embodiment, pulse-in-time graph 400 can be generated by adding timing information to circuit graph 300 of FIG. 3 based on calibration data from a most recent calibration performed on a quantum system to implement or execute quantum circuit 200. Adding timing information to circuit graph 300 can involve assigning or scheduling time slots to the pulses of circuit graph 300 using pulse durations of corresponding named pulses determined or set based on the calibration data. By way of example, based on the calibration data from the most recent calibration, the C0, C1, and C3 pulses can each be determined to have pulse durations of 1 time unit; and the C2 pulse can be determined to have a pulse duration of 2 time units. Time slots can be assigned to the pulses of circuit graph 300 using those pulse durations to generate pulse-in-time graph 400.

As represented by the bi-directional arrows with designator p' depicted in FIG. 4, some pulses of pulse-in-time graph 400 have associated pulses. In assigning or scheduling the time slots, pulses that have an associated pulse can be assigned such that associated pulses are scheduled for input to a quantum system at the same (or substantially same) time. For example, FIG. 4 depicts pulses 306 and 320 as being associated pulses. Accordingly, pulses 306 and 320 can both be assigned to time slots defined by a start time st of $t_3$ and an end time et of $t_4$. As another example, FIG. 4 also depicts pulses 308 and 326 as being associated pulses. As associated pulses, pulses 308 and 326 can both be assigned to time slots defined by a start time st of $t_7$ and an end time et of $t_8$.

Identity (or placeholder) pulses can be added or inserted in pulse-in-time graph 400 to account for any gaps in time that arise from assigning associated pulses. For example, identity pulse 460 can be added to pulse-in-time graph 400 to account for a gap in time between pulse 318 and pulse 320 that arises from assigning associated pulses 306 and 320. As shown by FIG. 4, pulse-in-time graph 400 further includes identity pulses 440, 450, and 470 that were also added to account for similar gaps in time.

In an embodiment, adding or inserting identity pulses can involve a qubit $q_i$ encountering a pulse p with an associated pulse p' on another qubit $q_j$. In response, a start time of $t_i$ can be proposed for scheduling pulse p on qubit $q_i$. A start time of $t_j$ can be proposed for scheduling associated pulse p' when qubit $q_j$ encounters associated pulse p'. Pulse p and associated pulse p' can be scheduled in a pulse-in-time graph at the proposed start time (e.g., $t_i$ or $t_j$) that occurs later in time. An identity pulse having a pulse duration of $|t_i - t_j|$ can be inserted in the pulse-in-time graph before a pulse (e.g., pulse p or associated pulse p') corresponding with the proposed start time that occurs earlier in time.

For example, first qubit 210 can encounter pulse 308 with an associated pulse (i.e., pulse 326) on second qubit 220. In response, a start time of $t_4$ can be proposed for scheduling pulse 308 on first qubit 210. A start time of $t_7$ can be proposed for scheduling pulse 326 when second qubit 220 encounters pulse 326 to facilitate scheduling pulses 322 and 324. Pulses 308 and 326 can be scheduled in pulse-in-time graph 400 at the proposed start time (i.e., $t_7$) that occurs later in time. Identity pulse 440 having a pulse duration of 3-time units (i.e., $|t_4 - t_7|$) can be inserted in pulse-in-time graph 400 before pulse 308.

Upon generating pulse-in-time graph 400 by adding the timing information to circuit graph 300 of FIG. 3, pulse-in-time graph 400 can be added to a job queue of the quantum system that stores existing directed graphs. After generation of pulse-in-time graph 400, a calibration of the quantum system can invalidate existing waveforms or directed graphs, such as the directed graphs stored in the job queue. One or more parameters of pulse-in-time graph 400 can be changed by that calibration of the quantum system.

For example, the calibration of the quantum system can change pulse frequencies associated with the C1 and C2 pulses of pulse-in-time graph 400. Based on the calibration data that was available when pulse-in-time graph 400 was generated, the pulse frequencies associated with the C1 and C2 pulses were each set to 2 Hertz (Hz). However, based on the new calibration data from the calibration that invalidated pulse-in-time graph 400, the pulse frequencies associated with the C1 and C2 pulses should each be set to 3 Hz. Instead of repeating each step of the waveform generation process discussed above, pulse-in-time graph 400 can be revised based on the new calibration data to generate updated pulse-in-time graph 500 of FIG. 5. In an embodiment, pulses associated with a parameter (e.g., a pulse frequency) of an invalidated pulse-in-time graph changed by a calibration of a quantum system that occurs after generation of that directed graph can be located for revision using a list traversal (e.g., with lookup table T) or a hash table of those pulses.

Figure 5:
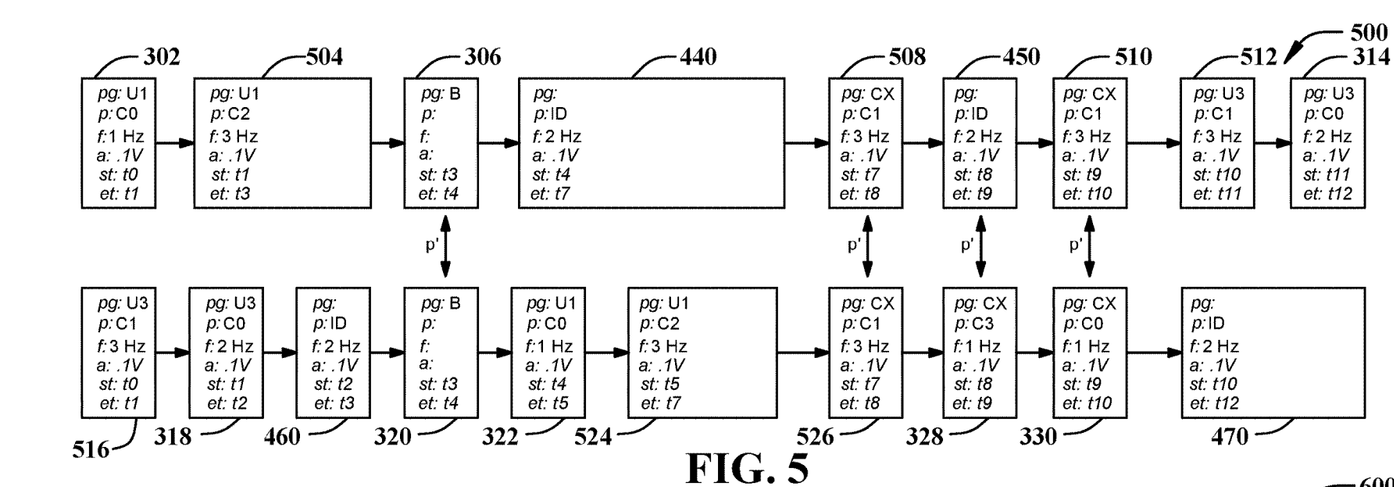
FIG. 5 illustrates an example, non-limiting updated pulse-in-time graph, in accordance with one or more embodiments described herein.

A comparison between FIGS. 4 and 5 shows that each pulse of pulse-in-time graph 400 that corresponds to a C1 or C2 pulse has been revised to include a pulse frequency of 3 Hz. For example, pulse-in-time graph 400 includes pulses 308, 310, 312, 316, and 326 that each correspond to a C1 pulse comprising a pulse frequency of 2 Hz; and pulses 304 and 324 that each correspond to a C2 pulse comprising a pulse frequency of 2 Hz. A pulse frequency for each of those pulses of pulse-in-time graph 400 that correspond to a C1 pulse or a C2 pulse have been revised from 2 Hz to 3 Hz to generate updated pulse-in-time graph 500. As shown by FIG. 5, a subset of pulse-in-time graph 400 (e.g., pulses 302, 314, 320, and 328) remains unchanged in updated pulse-in-time graph 500. Only pulses corresponding to a C1 pulse (e.g., pulses 508, 510, 512, 516, and 526) or a C2 pulse (e.g., pulses 504 and 524) have been changed in updated pulse-in-time graph 500.

As another example, the calibration of the quantum system can change pulse amplitudes associated with the C0 and identity (or placeholder) pulses of pulse-in-time graph 400. Based on the calibration data that was available when pulse-in-time graph 400 was generated, the pulse amplitudes associated with the C0 and identity pulses were each set to 0.1 volts (V). However, based on the new calibration data from the calibration that invalidated pulse-in-time graph 400, the pulse amplitudes associated with the C0 and identity pulses should each be set to 0.2 V. Instead of repeating each step of the waveform generation process discussed above, pulse-in-time graph 400 can be revised based on the new calibration data to generate updated pulse-in-time graph 600 of FIG. 6.

Figure 6:
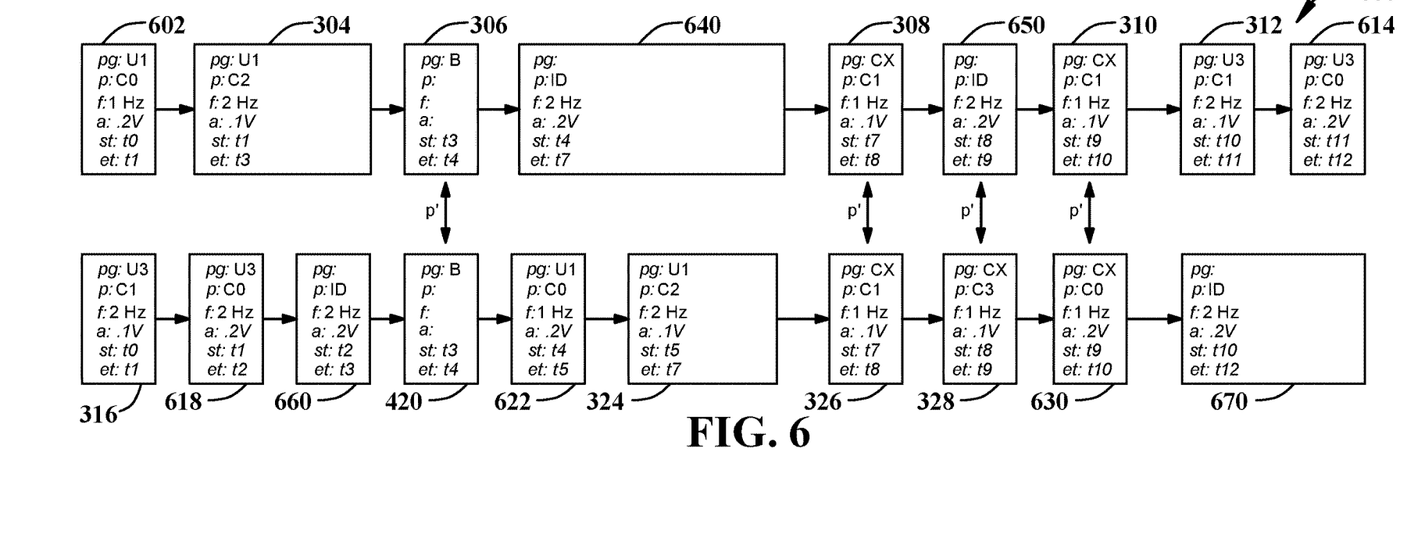
FIG. 6 illustrates another example, non-limiting updated pulse-in-time graph, in accordance with one or more embodiments described herein.

A comparison between FIGS. 4 and 6 shows that each pulse of pulse-in-time graph 400 that corresponds to a C0 or identity pulse has been revised to include a pulse amplitude of 0.2 V. For example, pulse-in-time graph 400 includes pulses 302, 314, 318, 322, and 330 that each correspond to a C0 pulse comprising a pulse amplitude of 0.1 V; and pulses 440, 450, 460, and 470 that each correspond to an identity pulse comprising a pulse amplitude of 0.1 V. A pulse amplitude for each of those pulses of pulse-in-time graph 400 that correspond to a C0 or identity pulse have been revised from 0.1 V to 0.2 V to generate updated pulse-in-time graph 600. As shown by FIG. 6, a subset of pulse-in-time graph 400 (e.g., pulses 304, 310, 320, and 326) remains unchanged in updated pulse-in-time graph 600. Only pulses corresponding to a C0 pulse (e.g., pulses 602, 614, 618, 622, and 630) or an identity pulse (e.g., pulses 640, 650, 660, and 670) have been changed in updated pulse-in-time graph 600.

As another example, the calibration of the quantum system can change a pulse duration associated with the C2 pulses of pulse-in-time graph 400. Based on the calibration data that was available when pulse-in-time graph 400 was generated, the pulse duration associated with the C2 pulses was set to two-time units. However, based on the new calibration data from the calibration that invalidated pulse-in-time graph 400, the pulse duration associated with the C2 pulse should be set to one-time unit. Instead of repeating each step of the waveform generation process discussed above, pulse-in-time graph 400 can be revised based on the new calibration data to generate updated pulse-in-time graph 700 of FIG. 7.

Figure 7:
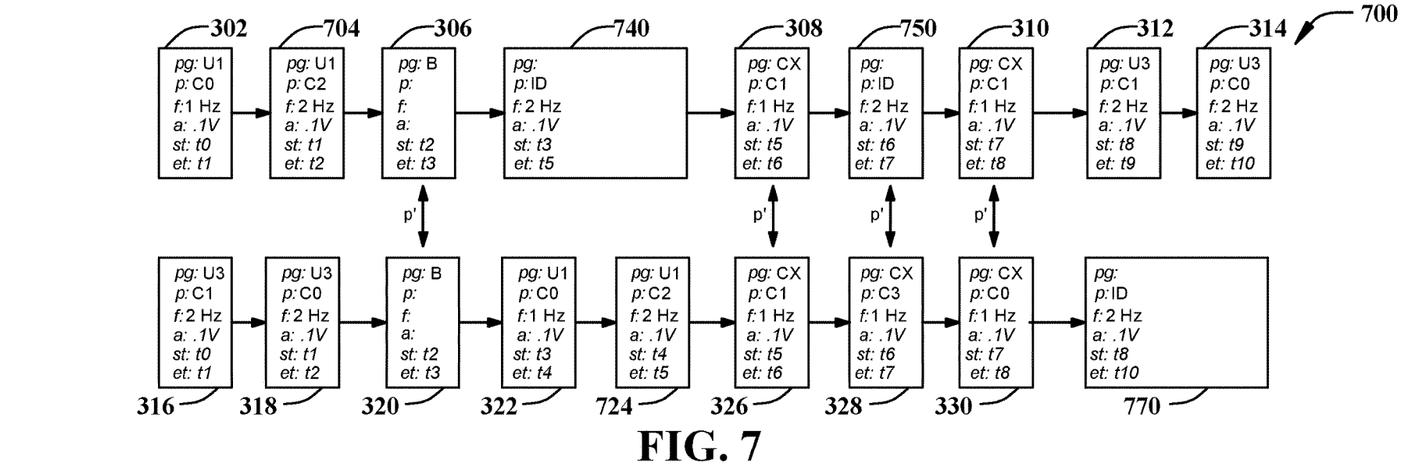
FIG. 7 illustrates another example, non-limiting updated pulse-in-time graph, in accordance with one or more embodiments described herein.

To generate updated pulse-in-time graph 700, each identity pulse inserted into pulse-in-time graph 400 can be removed. Accordingly, identity pulses 440, 450, 460, and 470 can each be removed from pulse-in-time graph 400 to generate updated pulse-in-time graph 700. Upon removing the inserted identity pulses, the first time (e.g., $t_i$) a C2 pulse is encountered on a particular qubit, an end time (e.g., $t_{i+1}$) of the C2 pulse is set to 1-time unit after a corresponding start time. For example, pulse 304 is the first time a C2 pulse is encountered on first qubit 210 is at $t_1$. An end time of pulse 304 in pulse-in-time graph 400 is set to $t_3$. In updated pulse-in-time graph 700, a start time of pulse 704 that corresponds to that C2 pulse remains $t_1$; however, an end time of pulse 704 has been revised from $t_3$ to $t_2$ to reflect the updated 1-time unit pulse duration for C2 pulses. Likewise, pulse 324 in pulse-in-time graph 400 is the first time a C2 pulse is encountered on second qubit 220. In updated pulse-in-time graph 700, an end time of pulse 724 has similarly been revised to reflect the updated 1-time unit pulse duration for C2 pulses.

Downstream portions of pulse-in-time graph 400 comprising each future gate or operation scheduled after a C2 pulse for first qubit 210 (e.g., pulses 308, 310, 312, and 314) or for second qubit 220 (e.g., pulses 326, 328, and 330) are rescheduled according to the respective end times of pulses 704 and 724. Those future gates or operations can be rescheduled while ensuring that associated pulses remain scheduled for input to the quantum system at the same (or substantially same) time, as shown by FIG. 7. After rescheduling those future gates or operations, identity (or placeholder) pulses can be added or inserted in updated pulse-in-time graph 700, as discussed above with respect to FIG. 4, to account for any gaps in time that arise from assigning associated pulses. In FIG. 7, such identity pulses inserted into updated pulse-in-time graph 700 include pulses 740, 750, and 770. The preceding disclosure concerning pulse duration changes that arise from calibrations of a quantum system is discussed in terms of a reduction in pulse duration. However, one skilled in the art will appreciate that the disclosed technique can similarly be applied to increases in pulse duration that arise from calibrations of a quantum system.

As another example, the calibration of the quantum system can change a gate definition for each U1 gate (e.g., UI gates 230 and 235 of FIG. 2) implemented by pulses of pulse-in-time graph 400. Based on the calibration data that was available when pulse-in-time graph 400 was generated, the gate definition for implementing U1 gates involved applying a pulse sequence comprising a C0 pulse followed by a C2 pulse to a qubit for implementing a U1 gate. However, based on the new calibration data from the calibration that invalidated pulse-in-time graph 400, the gate definition for implementing U1 gates involves applying a C0 pulse to a qubit for implementing a U1 gate. Instead of repeating each step of the waveform generation process discussed above, pulse-in-time graph 400 can be revised based on the new calibration data to generate updated pulse-in-time graph 800 of FIG. 8.

Figure 8:
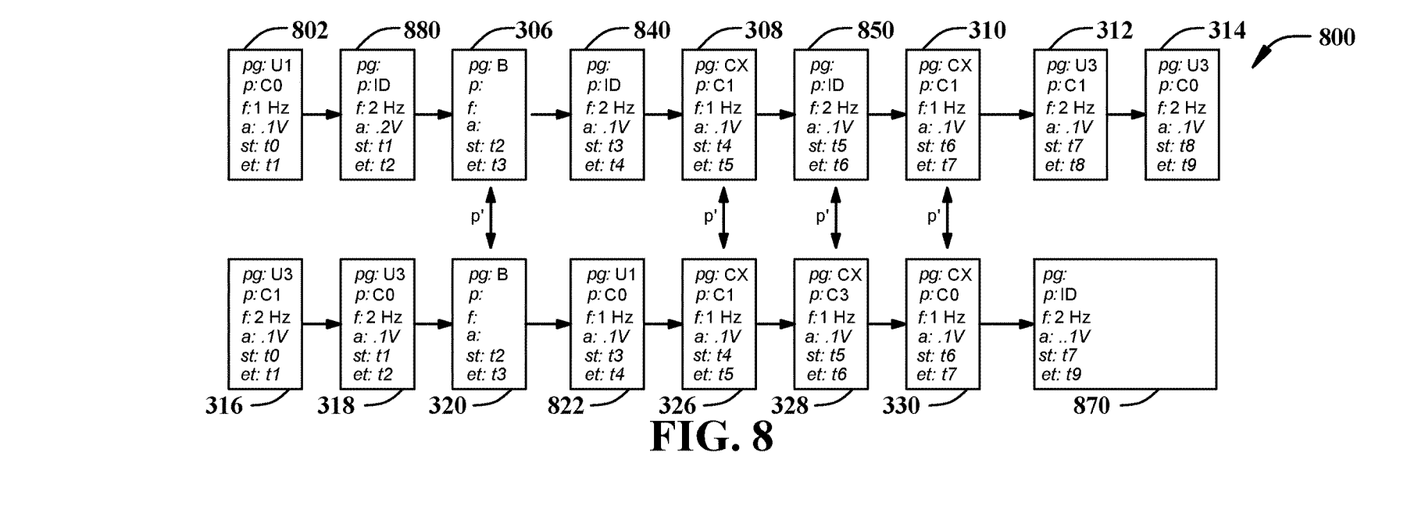
FIG. 8 illustrates another example, non-limiting updated pulse-in-time graph, in accordance with one or more embodiments described herein.

To generate updated pulse-in-time graph 800, each identity pulse inserted into pulse-in-time graph 400 can be removed. Accordingly, identity pulses 440, 450, 460, and 470 can each be removed from pulse-in-time graph 400 to generate updated pulse-in-time graph 800. Upon removing the inserted identity pulses, each pulse of pulse-in-time graph 400 that implements a U1 gate is identified. In an embodiment, each pulse of an invalidated pulse-in-time graph that implements a gate associated with a changed gate definition can be located for revision using a list traversal (e.g., with lookup table T) or a hash table of those pulses. Each pulse of pulse-in-time graph 400 that implements a U1 gate (e.g., pulses 302 and 304 for implementing U1 gate 230; and pulses 322 and 324 for implementing U1 gate 235) can be removed and replaced with pulses that conform with the new gate definition (e.g., pulse 802 for implementing U1 gate 230 and pulse 822 for implementing U1 gate 235).

Downstream portions of pulse-in-time graph 400 comprising each future gate or operation scheduled after a U1 gate for first qubit 210 (e.g., pulses 306, 308, 310, 312, and 314) or for second qubit 220 (e.g., pulses 326, 328, and 330) are rescheduled according to the respective end times of pulses 802 and 822. Those future gates or operations can be rescheduled while ensuring that associated pulses remain scheduled for input to the quantum system at the same (or substantially same) time, as shown by FIG. 8. After rescheduling those future gates or operations, identity (or placeholder) pulses can be added or inserted in updated pulse-in-time graph 800, as discussed above with respect to FIG. 4, to account for any gaps in time that arise from assigning associated pulses. In FIG. 8, such identity pulses inserted into updated pulse-in-time graph 800 include pulses 840, 850, 870, and 880.

Figure 9:
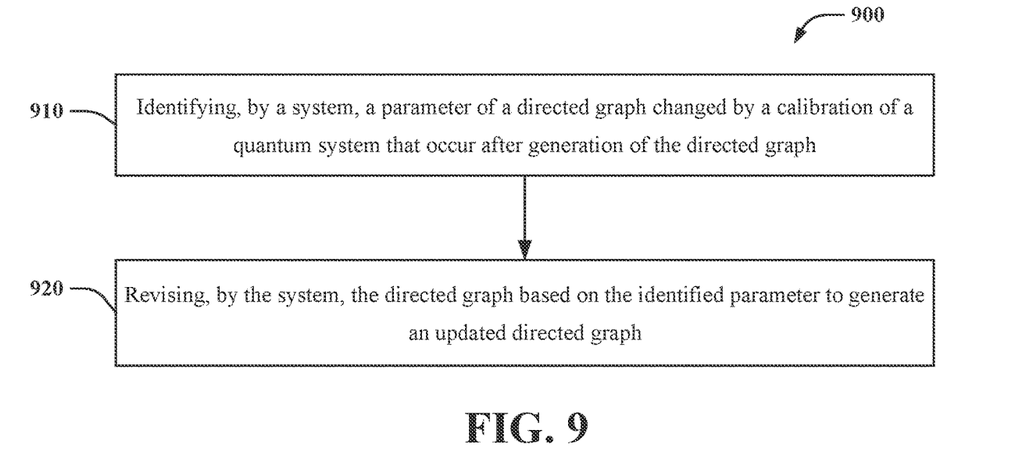
FIG. 9 illustrates a flow diagram of an example, non-limiting computer-implemented method of facilitating quick waveform revisions following quantum system calibrations, in accordance with one or more embodiments described herein.

FIG. 9 illustrates a flow diagram of an example, non-limiting computer-implemented method 900 of facilitating quick waveform revisions following quantum system calibrations, in accordance with one or more embodiments described herein. Repetitive description of like elements employed in other embodiments described herein is omitted for sake of brevity.

At 910, the computer-implemented method 900 can comprise identifying, by a system (e.g., with calibration component 140 of FIG. 1), a parameter of a directed graph changed by a calibration of a quantum system that occur after generation of the directed graph. In an embodiment, the parameter includes: pulse phase; pulse duration; pulse frequency; pulse amplitude; gate definition; or a combination thereof. In an embodiment, the system can identify the parameter using metadata associated with a plurality of named pulses comprising the directed graph.

At 920, the computer-implemented method 900 can comprise revising, by the system (e.g., with regeneration component 150 of FIG. 1), the directed graph based on the identified parameter to generate an updated directed graph. In an embodiment, the system can revise the directed graph by modifying a pulse frequency of a pulse. In an embodiment, the system can modify the pulse frequency using a list traversal or a hash table of the pulse. In an embodiment, the system can revise the directed graph by inserting or removing a placeholder pulse to maintain synchronization within the updated directed graph. In an embodiment, the system can revise the directed graph by modifying a pulse amplitude of a pulse.

In an embodiment, the computer-implemented method 900 can further comprise: monitoring, by the system (e.g., with tracking component 160 of FIG. 1), calibration data to detect changes that invalidate directed graphs. In an embodiment, the computer-implemented method 900 can further comprise: interrupting, by the system (e.g., with calibration component 140), a job queue of the quantum system that comprises the directed graph.

Figure 10:
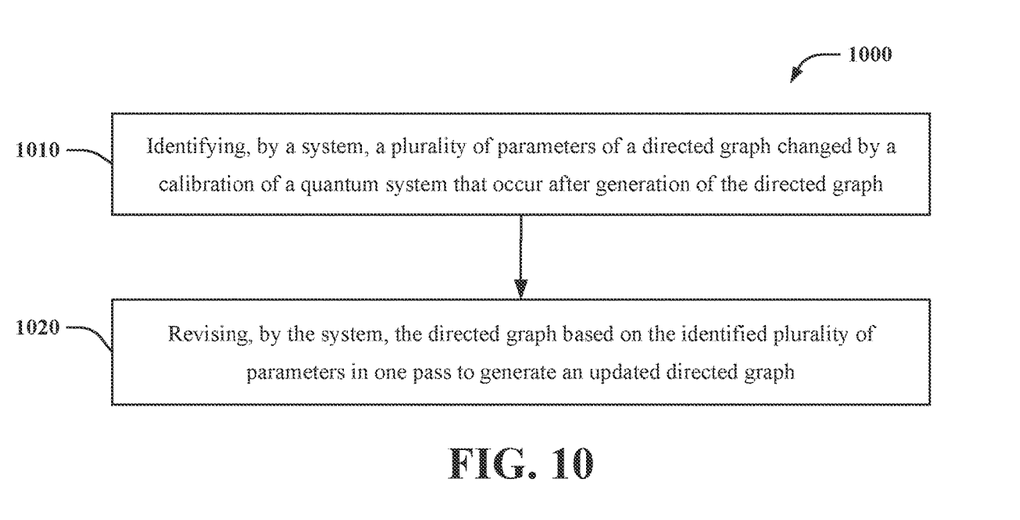
FIG. 10 illustrates a flow diagram of another example, non-limiting computer-implemented method of facilitating quick waveform revisions following quantum system calibrations, in accordance with one or more embodiments described herein.

FIG. 10 illustrates a flow diagram of an example, non-limiting computer-implemented method 1000 of facilitating quick waveform revisions following quantum system calibrations, in accordance with one or more embodiments described herein. Repetitive description of like elements employed in other embodiments described herein is omitted for sake of brevity. At 1010, the computer-implemented method 1000 can comprise identifying, by a system (e.g., with calibration component 140 of FIG. 1), a plurality of parameters of a directed graph changed by a calibration of a quantum system that occurs after generation of the directed graph. For example, the system can identify a pulse phase and a pulse duration associated with the directed graph that are changed by a calibration of a quantum system that occurs after generation of the directed graph. As another example, the system can identify a pulse amplitude and a pulse frequency associated with the directed graph that are changed by a calibration of a quantum system that occurs after generation of the directed graph. At 1020, the computer-implemented method 1000 can comprise revising, by the system (e.g., with regeneration component 150 of FIG. 1), the directed graph based on the identified plurality of parameters in one pass to generate an updated directed graph. In an embodiment, a subset of the directed graph remains unchanged in the updated directed graph.

Figure 11:
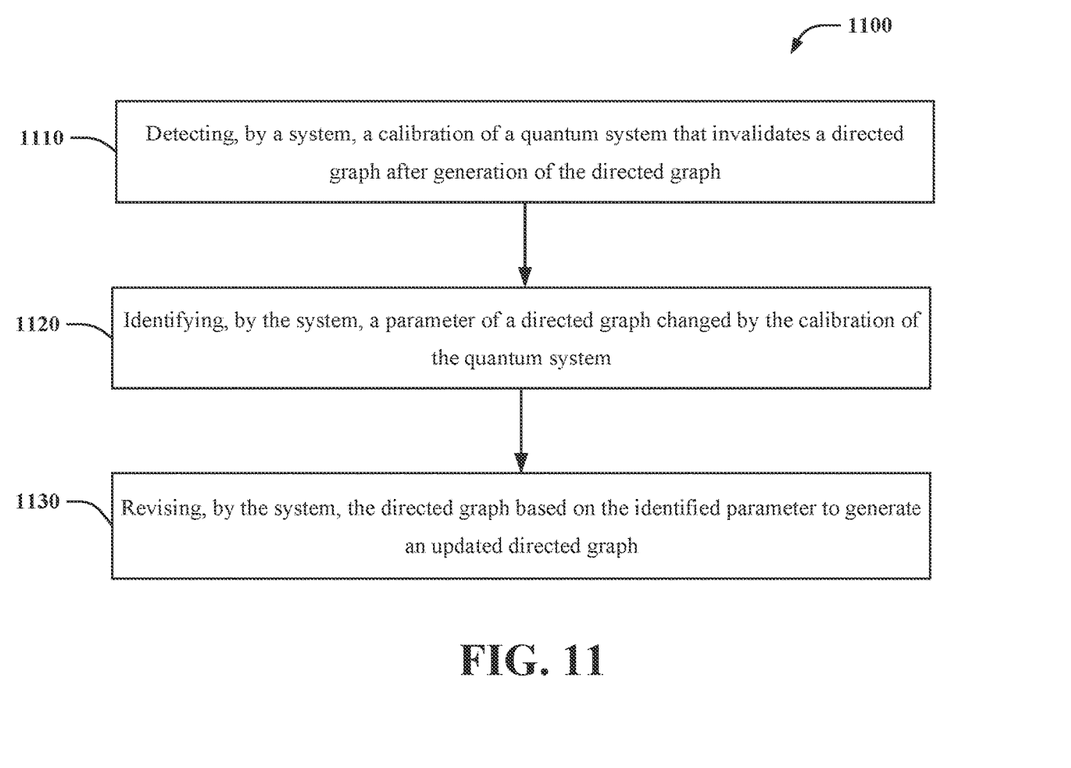
FIG. 11 illustrates a flow diagram of another example, non-limiting computer-implemented method of facilitating quick waveform revisions following quantum system calibrations, in accordance with one or more embodiments described herein.

FIG. 11 illustrates a flow diagram of an example, non-limiting computer-implemented method 1100 of facilitating quick waveform revisions following quantum system calibrations, in accordance with one or more embodiments described herein. Repetitive description of like elements employed in other embodiments described herein is omitted for sake of brevity. At 1110, the computer-implemented method 1100 can comprise detecting, by a system (e.g., with tracking component 160 of FIG. 1), a calibration of a quantum system that invalidates a directed graph after generation of the directed graph.

At 1120, the computer-implemented method 1100 can comprise identifying, by the system (e.g., with calibration component 140 of FIG. 1), a parameter of a directed graph changed by a calibration of a quantum system that occurs after generation of the directed graph. In an embodiment, the system can identify the parameter using metadata associated with a plurality of named pulses comprising the directed graph. At 1130, the computer-implemented method 1100 can further comprise revising, by the system (e.g., with regeneration component 150 of FIG. 1), the directed graph based on the identified parameter to generate an updated directed graph. In an embodiment, a subset of the directed graph remains unchanged in the updated directed graph.

In an embodiment, the computer-implemented method 1100 can further comprise evaluating, by the system using a model, computation costs associated with revising the directed graph based on the identified parameter prior to revising the directed graph. In an embodiment, the computer-implemented method 1100 can further comprise rebuilding, by the system, the directed graph to generate a new directed graph responsive to an evaluation that indicates the computation costs associated with revising the directed graph exceed computation costs associated with the rebuilding.

Figure 12:
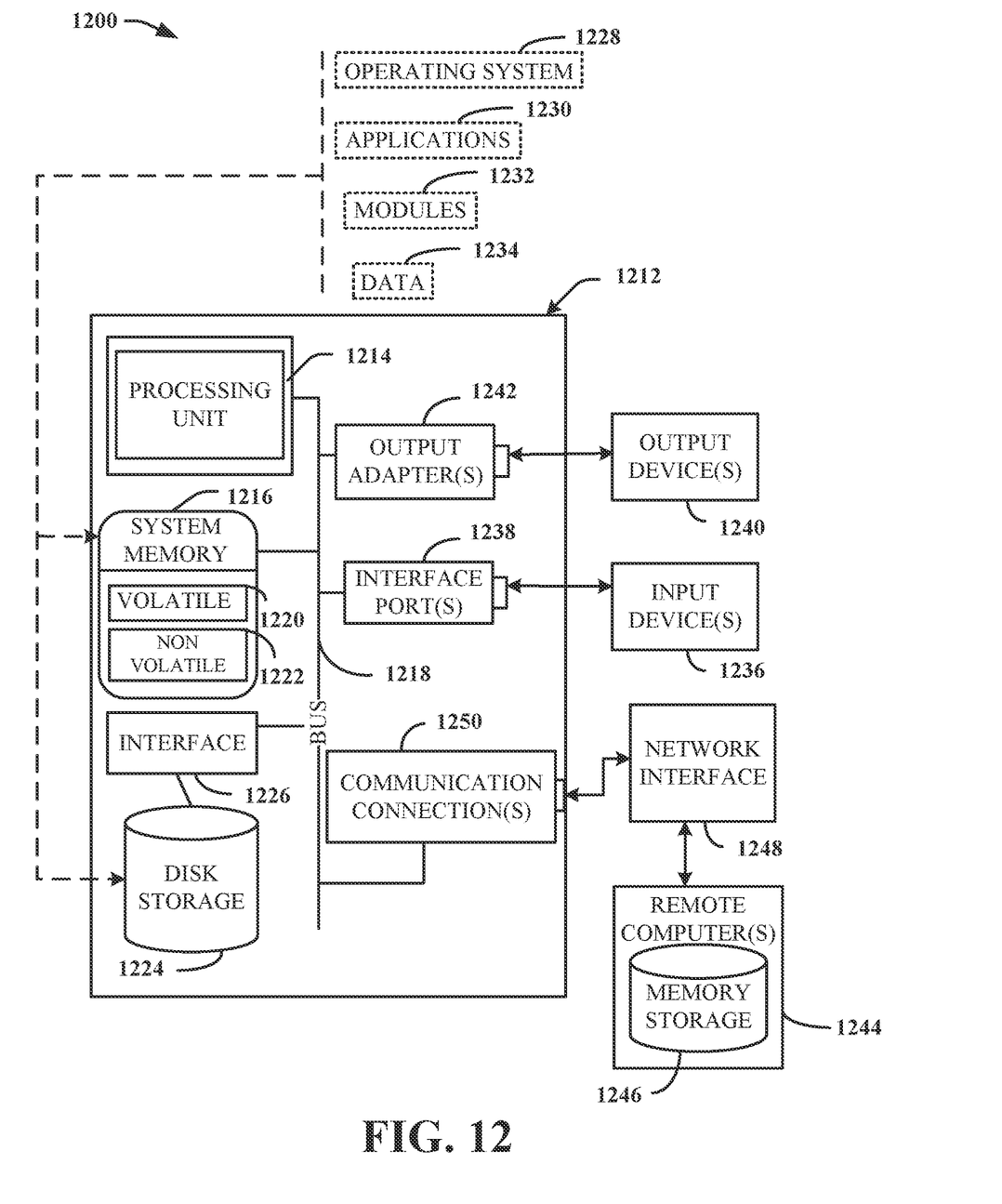
FIG. 12 illustrates a block diagram of an example, non-limiting operating environment in which one or more embodiments described herein can be facilitated.

In order to provide a context for the various aspects of the disclosed subject matter, FIG. 12 as well as the following discussion are intended to provide a general description of a suitable environment in which the various aspects of the disclosed subject matter can be implemented. FIG. 12 illustrates a suitable operating environment 1200 for implementing various aspects of this disclosure can also include a computer 1212. The computer 1212 can also include a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214. The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 1216 can also include volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 1220 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1212 can also include removable/non-removable, volatile/non-volatile computer storage media. FIG. 12 illustrates, for example, a disk storage 1224. Disk storage 1224 can also include, but is not limited to, devices like a magnetic disk drive, floppy disk drive, tape drive, Jaz drive, Zip drive, LS-100 drive, flash memory card, or memory stick. The disk storage 1224 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1224 to the system bus 1218, a removable or non-removable interface is typically used, such as interface 1226. FIG. 12 also depicts software that acts as an intermediary between users and the basic computer resources described in the suitable operating environment 1200. Such software can also include, for example, an operating system 1228. Operating system 1228, which can be stored on disk storage 1224, acts to control and allocate resources of the computer 1212. System applications 1230 take advantage of the management of resources by operating system 1228 through program modules 1232 and program data 1234, e.g., stored either in system memory 1216 or on disk storage 1224. It is to be appreciated that this disclosure can be implemented with various operating systems or combinations of operating systems. A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port can be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It can be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a computer, a server, a router, a network PC, a workstation, a microprocessor-based appliance, a peer device or other common network node and the like, and typically can also include many or the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1250 refers to the hardware/software employed to connect the network interface 1248 to the system bus 1218. While communication connection 1250 is shown for illustrative clarity inside computer 912, it can also be external to computer 1212. The hardware/software for connection to the network interface 1248 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor that executes the following computer-executable components stored in memory:
a calibration component that identifies a parameter of a directed graph changed by a calibration of a quantum system that occurs after generation of the directed graph; and
a regeneration component that revises the directed graph based on the identified parameter to generate an updated directed graph.

2. The system of claim 1, wherein the parameter includes: pulse phase; pulse duration; pulse frequency; pulse amplitude; gate definition; or a combination thereof.

3. The system of claim 1, wherein the calibration component identifies the parameter using metadata associated with a plurality of named pulses comprising the directed graph.

4. The system of claim 1, wherein the regeneration component revises the directed graph by modifying a pulse frequency of a pulse.

5. The system of claim 4, wherein the regeneration component modifies the pulse frequency using a list traversal or a hash table of the pulse.

6. The system of claim 1, wherein the regeneration component revises the directed graph by inserting or removing a placeholder pulse to maintain synchronization within the updated directed graph.

7. The system of claim 1, wherein the regeneration component revises the directed graph by modifying a pulse amplitude of a pulse.

8. The system of claim 1, further comprising:
a tracking component that monitors calibration data to detect changes that invalidate directed graphs.

9. The system of claim 1, wherein the calibration component interrupts a job queue of the quantum system that comprises the directed graph.

10. A computer-implemented method, comprising:
identifying, by a system, a parameter of a directed graph changed by a calibration of a quantum system that occur after generation of the directed graph; and
revising, by the system, the directed graph based on the identified parameter to generate an updated directed graph.

11. The computer-implemented method of claim 10, wherein the parameter includes: pulse phase; pulse duration; pulse frequency; pulse amplitude; gate definition; or a combination thereof.

12. The computer-implemented method of claim 10, wherein the system identifies the parameter using metadata associated with a plurality of named pulses comprising the directed graph.

13. The computer-implemented method of claim 10, wherein the system revises the directed graph by modifying a pulse frequency of a pulse.

14. The computer-implemented method of claim 13, wherein the system modifies the pulse frequency using a list traversal or a hash table of the pulse.

15. The computer-implemented method of claim 10, wherein the system revises the directed graph by inserting or removing a placeholder pulse to maintain synchronization within the updated directed graph.

16. The computer-implemented method of claim 10, wherein the system revises the directed graph by modifying a pulse amplitude of a pulse.

17. The computer-implemented method of claim 10, further comprising:
monitoring, by the system, calibration data to detect changes that invalidate directed graphs.

18. The computer-implemented method of claim 10, further comprising:
interrupting, by the system, a job queue of the quantum system that comprises the directed graph.

19. A computer program product comprising a computer readable storage medium having program instructions embodied therewith, the program instructions executable by a processor to cause the processor to:
identify a parameter of a directed graph changed by a calibration of a quantum system that occur after generation of the directed graph; and
revise the directed graph based on the identified parameter to generate an updated directed graph.

20. The computer program product of claim 19, wherein the parameter includes: pulse phase; pulse duration; pulse frequency; pulse amplitude; gate definition; or a combination thereof.

21. A computer-implemented method, comprising:
identifying, by a system, a plurality of parameters of a directed graph changed by a calibration of a quantum system that occur after generation of the directed graph; and
revising, by the system, the directed graph based on the identified plurality of parameters in one pass to generate an updated directed graph.

22. The computer-implemented method of claim 21, wherein a subset of the directed graph remains unchanged in the updated directed graph.

23. A computer-implemented method, comprising:
detecting, by a system, a calibration of a quantum system that invalidates a directed graph after generation of the directed graph;
identifying, by the system, a parameter of a directed graph changed by the calibration of the quantum system; and
revising, by the system, the directed graph based on the identified parameter to generate an updated directed graph.

24. The computer-implemented method of claim 23, wherein the system identifies the parameter using metadata associated with a plurality of named pulses comprising the directed graph.

25. The computer-implemented method of claim 23, further comprising:
evaluating, by the system using a model, computation costs associated with revising the directed graph based on the identified parameter prior to revising the directed graph; and
rebuilding, by the system, the directed graph to generate a new directed graph responsive to an evaluation that indicates the computation costs associated with revising the directed graph exceed computation costs associated with the rebuilding.

* * * * *